United States Patent [19]

Schaub et al.

[11] 4,235,596
[45] Nov. 25, 1980

[54] PROCESS FOR THE PAD-DYEING AND PRINTING OF TEXTILE MATERIAL MADE FROM MIXED FIBRES OF CELLULOSE AND POLYESTER

[75] Inventors: Andres Schaub, Biel; Paul Dussy; Peter Aeschlimann, both of Basel; Stefan Koller, Ramlinsburg, all of Switzerland

[73] Assignee: Ciba-Geigy Corporation, Ardsley, N.Y.

[21] Appl. No.: 963,498

[22] Filed: Nov. 24, 1978

Related U.S. Application Data

[63] Continuation of Ser. No. 752,591, Dec. 20, 1976, abandoned.

[30] Foreign Application Priority Data

Dec. 23, 1975 [CH] Switzerland ............... 16698/75

[51] Int. Cl.$^3$ .............. D06P 1/382; D06P 3/85; D06P 5/02; C09B 65/00
[52] U.S. Cl. ........................................ 8/456; 8/464; 8/476; 8/532
[58] Field of Search ............. 8/29, 30, 31, 17, 18 R, 8/1 F, 74, 72, 21 C

[56] References Cited

U.S. PATENT DOCUMENTS

| | | | |
|---|---|---|---|
| 3,066,005 | 11/1962 | Wedemeyer et al. | 8/54.2 |
| 3,073,662 | 1/1963 | Jaeger et al. | 8/18 |
| 3,418,063 | 12/1968 | Ulrich et al. | 8/21 C |
| 3,449,353 | 6/1969 | Porret et al. | 8/21 C |
| 3,702,752 | 11/1972 | Bent et al. | 8/21 C |
| 3,853,459 | 12/1974 | Harper et al. | 8/31 |

FOREIGN PATENT DOCUMENTS

| | | | |
|---|---|---|---|
| 1281645 | 12/1961 | France | 8/29 |
| 971358 | 9/1964 | United Kingdom | 8/29 |
| 1058966 | 2/1967 | United Kingdom . | |
| 1313945 | 4/1973 | United Kingdom . | |

*Primary Examiner*—Joseph L. Schofer
*Assistant Examiner*—Maria S. Tungol
*Attorney, Agent, or Firm*—Edward McC. Roberts

[57] ABSTRACT

Process for the pad-dyeing and printing of textile material made from mixed fibres of cellulose and polyester, which process comprises impregnating of printing the textile material with a dispersion of a disperse dye containing at least one hetero atom which can be alkylated; treating the textile material, before, during or after the impregnating or printing operation, with a compound containing at least two epoxy groups or groups convertible into epoxy groups; and subjecting the material impregnated or printed with dye and epoxy compound to a heat treatment.

16 Claims, No Drawings

PROCESS FOR THE PAD-DYEING AND PRINTING OF TEXTILE MATERIAL MADE FROM MIXED FIBRES OF CELLULOSE AND POLYESTER

This is a continuation of application Ser. No. 752,591 filed on Dec. 20, 1976 now abandoned.

The present invention relates to a process for the pad-dyeing and printing of textile material, made from mixed fibres of cellulose and polyester, with water-insoluble disperse dyes, to the padding liquors or printing pastes suitable for performing the process, as well as to the material dyed or printed by this process.

Particular problems arise in the dyeing of mixed fabrics made from cellulose and polyester fibres, since on the one hand with the acid dyes, direct dyes, metal-complex dyes or reactive dyes, which are suitable for dyeing cellulose fibres, satisfactory dyeings of the polyester fibres cannot be obtained, and on the other hand the disperse dyes, practically exclusively used for dyeing polyester material, produce in the known dyeing processes at most a staining of the cellulose fibres.

For the pad-dyeing or printing of mixed fibres made from cellulose and polyester there is customarily used, therefore, a padding liquor or printing paste containing a dye mixture of the respective dyes suitable for the individual constituents of the mixed fibres; however, only rarely can the constituents of the mixed fibres be dyed in exactly the same shade.

A process for padding mixed fibres of cellulose and synthetic material is known from the German Auslegeschrift No. 1,811,796, in which process both constituents of the mixed fibres are dyed with the same predispersed dye, and for this purpose there is employed a padding liquor containing a solvent and swelling agent, as well as special disperse dyes of which the saturated solution in boiling 0.1 molar aqueous sodium carbonate solution exhibits at the wavelength of the maximum absorption an extinction of at most 9.8, where the extinction is determined by a 10-fold dilution of the boiling saturated solution with triethylene glycol dimethyl ether, measurement of the absorption of the diluted solution and calculation of the extinction of the saturated boiling solution according to Beer's Law.

This process has however the disadvantages that there are available only a limited number of suitable dyes possessing adequate wet-fastness properties; and that the fixing values of the dyes are frequently insufficient in practice.

It has now been found that for the pad-dyeing or printing of textile material made from cellulose fibres or from mixed fibres of cellulose and polyester, a very large number of dyes are applicable if disperse dyes containing a hetero atom which can be alkylated are used together with compounds containing epoxy groups.

The present invention hence relates to a process for the pad-dyeing and printing of textile material made from mixed fibres of cellulose and polyester, which process comprises impregnating or printing the textile material with the dispersion of a disperse dye containing at least one hetero atom which can be alkylated; treating the textile material, before, during or after the impregnating or printing operation, with a compound containing at least two epoxy groups or groups convertible into epoxy groups; and subjecting the material impregnated or printed with dye and epoxy compound to a heat treatment.

Textile material made from mixed fibres of cellulose and polyester can be dyed or printed by the process according to the invention. Suitable cellulose material is that made from natural and regenerated cellulose, such as hemp, linen, jute, viscose silk, spun rayon or especially cotton; and suitable polyester material is, in particular, material made from linear high-molecular polyesters, for example linear high-molecular esters of aromatic polycarboxylic acids with polyfunctional alcohols, such as those from terephthalic acid and ethylene glycol or dimethylolcyclohexane, or mixed polymers from terephthalic acid and isophthalic acid with ethylene glycol.

The textile material can be in the form of looped fabric, such as knitwear or knitted fabrics, or in the form of fibre fleece material or, preferably, in the form of fabric.

Suitable disperse dyes for the process according to the invention are dyes free from water-solubilising groups, especially sulphonic acid groups, which dyes contain at least one hetero atom which can be alkylated.

These dyes can belong to a variety of classes of dyes: suitable dyes are, e.g., nitro, acridone, stilbene, perinone, naphthoquinoneimine, quinophthalone, styryl, formazan and phthalocyanine dyes, particularly however anthraquinone and azo dyes.

The dyes usable according to the invention contain at least one hetero atom which can be alkylated, such as an oxygen or sulphur atom, preferably however a nitrogen atom which can be alkylated. Particularly suitable are the dyes which contain at least one —SO$_2$NHR group, wherein R can represent hydrogen or an optionally substituted alkyl, aryl, cycloalkyl or aralkyl group.

These disperse dyes can be present singly or in the form of mixtures in the printing paste or padding liquor.

Before, during or after the impregnating or printing operation, the textile material is treated according to the invention with a compound containing at least 2 epoxy groups or groups convertible into epoxy groups. Suitable compounds are, e.g.:

(1) Polyepoxy compounds of an aliphatic, cycloaliphatic or aromatic polyalcohol, especially the diepoxy compounds, such as the diglycidyl ethers of the formula

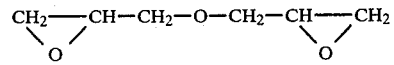

or of the formula

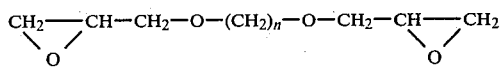

wherein n represents an integer from 1 to 8; or compounds of the formula

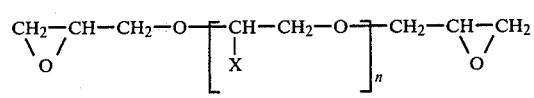

wherein X represents hydrogen or the CH$_3$ group, and n an integer from 1 to 50; as well as compounds of the formula

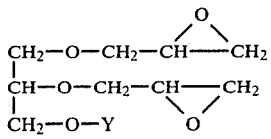

wherein Y represents hydrogen or the

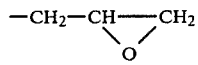

group.

Examples of compounds which correspond to these formulae are the diglycidyl ethers of ethylene glycol, propylene glycol, trimethylene glycol, 1,4-butanediol, 1,3-butanediol, 2,3-butanediol, 1,5-pentanediol, 2,4-pentanediol, 1,6-hexanediol, 2,5-hexanediol or 2-methyl-2,4-pentanediol. In addition to using these water-soluble polyepoxides, it is also possible to use according to the invention water-insoluble epoxides, provided that these are used in the emulsified state. Examples of water-insoluble polyepoxides are the diglycidyl ethers of 1,4-dihydroxybenzene, of 4,4'-dihydroxydiphenyl ether or, in particular, of 4,4'-dihydroxydiphenyldimethylpropane.

(2) Polyepoxy compounds of an aliphatic, cycloaliphatic or aromatic mono- or polyamine, preferably the diepoxy compounds.

(3) Polyepoxy compounds of a nitrogen-containing heterocycle, e.g. the compounds of the formulae

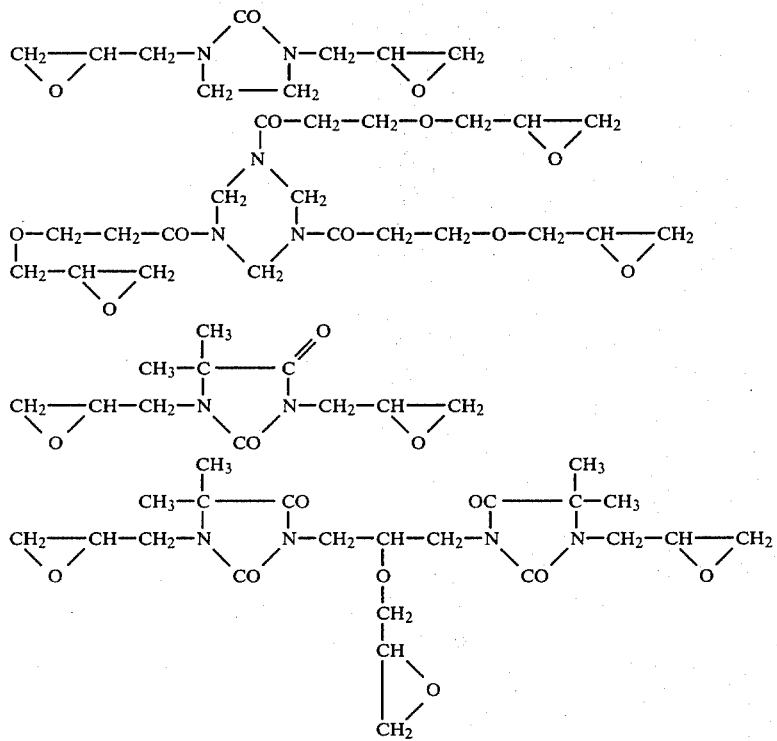

(4) Phosphoric acid esters containing preferably 2 or 3 epoxy groups, e.g. the compound of the formula

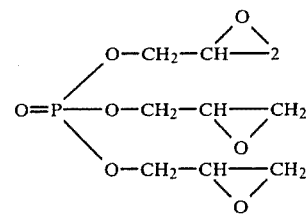

It is possible to use in the process according to the invention, instead of epoxy compounds, compounds containing groups convertible under the dyeing or fixing conditions into epoxy compounds, e.g. the halogenohydrin group, preferably the chlorohydrin group.

The polyepoxy compound can be applied to the textile material before, after or during the impregnating or printing operation. In the last-mentioned case, it is simply added to the aqueous padding liquor or printing paste, and then applied simultaneously with the dye to the textile material. In the first two cases, the epoxy compound and dye are applied successively in two separate operations, optionally with the insertion of a drying process. The epoxy compound is used in this case in the form of an aqueous solution or dispersion.

The printing paste or padding liquor optionally contains, besides the disperse dye, a swelling agent; in many cases however the epoxy compound simultaneously serves as a swelling agent. If a swelling agent is additionally used, glycols and glycol derivatives are suitable for the purpose, such as polyethylene glycols, particularly those having a mean molecular weight of about 400–600, also ethers and esters of polyethylene glycols, such as methoxydiethylene glycol acetate or β-phenoxyethanol, also propylene glycols, as well as reaction products of alkylene oxides with phenols, arylamines, mercapto compounds or sulphonic acids. Also suitable are reaction products of a polyethylene glycol with compounds such as chloroformic acid ethyl ester or methanesulphonyl chloride, as well as reaction products of alkylene oxides with glycerin, trimethylolpropane, pentaerythritol or sorbitol.

Furthermore, the padding liquor or printing paste also contains dispersing agents, preferably anionic or nonionic dispersing agents. These are used in particular to obtain a fine distribution of the disperse dyes. Suitable dispersing agents are those customarily employed in dyeing with disperse dyes.

In addition, the padding liquor or printing paste can contain thickening agents, such as types of gum, tragacanth, starch, starch ether and carob bean flour derivatives, as well as further additives affecting the properties of the fibres, e.g. softening agents, antistatic agents, antioxidants, antimicrobial agents, additives for imparting a flameproof finish or for improving the hydrophilic properties, as well as dirt-repelling, water-repelling and oil-repelling agents.

The dyes are in general present in amounts of about 5 to 30 g, the epoxides in amounts of 5 to 150 g, preferably 20 to 100 g, and the swelling agents, if present, in amounts of 10 to 200 g, preferably 50 to 150 g, per kg of padding liquor or printing paste.

The fixing of the dyes on the material impregnated with dye and epoxide compound is performed, optionally after previous drying, by heating the material at temperatures above 100°, for example by heating for 30 to 120 seconds at 190° to 220° C., preferably for 60 seconds at 200° to 210° C.; or by steaming, e.g. at normal pressure with superheated steam at 170° to 200° C. for 3 to 12 minutes, preferably 5 to 8 minutes, or with steam at 1.5 bars excess pressure for 15 to 30 minutes.

After fixing, the material is finished in a known manner, for example by rinsing at 60° C. and drying.

A further possibility for carrying out the process according to the invention consists of firstly pretreating the textile material with a solution or dispersion of a polyepoxy compound and subsequently applying the dye to the textile material by the transfer printing method.

Printings or dyeings having high fixation values are obtained by the process according to the invention. It is possible in particular to obtain on mixed fabrics made from cellulose and polyester fibres very level tone-in-tone dyeings. The wet-fastness properties are improved by the use of epoxy compounds. Whereas the disperse dyes applied by the usual processes can be extracted from, e.g., the cellulose constituent with organic solvents, such as dimethylformamide, this is no longer possible in the case of dyes which have been applied by the process according to the invention, i.e. together with epoxy compounds. This is because of the reaction of the epoxy groups with the hetero atom of the dyes, which atom can be alkylated, and/or with the hydroxy groups of the cellulose.

The invention is illustrated by the following Examples without being limited to them. The quantity values relate in the case of the dyes to the commercial product, i.e. to the diluted product; percentages are by weight and temperatures are in degrees Centigrade.

EXAMPLE 1

A fabric composed of 50% of cotton and 50% of polyester is impregnated with an aqueous dye liquor containing per liter 100 g of a 10% dispersion of the dye of the formula

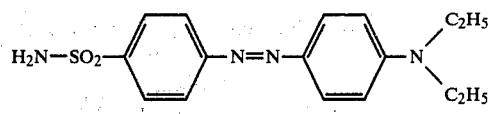

and 100 g of the compound of the formula

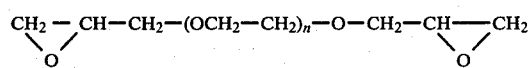

n = about 7;

and is then squeezed out to 80% liquor absorption. The fabric is subsequently dried, and the applied dye is fixed for 60 seconds in an air current at 200°. On rinsing in water at 60°, there results a level orange-red tone-in-tone dyeing having good fastness properties.

EXAMPLE 2

A stock thickening of the following composition is prepared:

| | |
|---|---|
| 50 parts of emulsifier | (condensation product from hexamethylene-diisocyanate and the adduct from 1 mole of oleyl alcohol and 80 moles of ethylene oxide), |
| 150 parts of water, | |
| 400 parts of white spirit (boiling point 120-180°), | |
| 400 parts of 10% starch ether solution, | |
| 1000 parts. | |

There are then incorporated into 800 parts of this stock thickener, with a high-speed stirrer:
100 parts of polyethylene glycol 400,
80 parts of a 10% dispersion of the dye of the formula

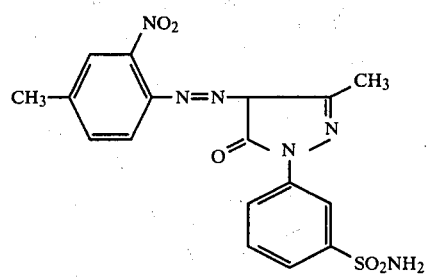

and
20 parts of the compound of the formula

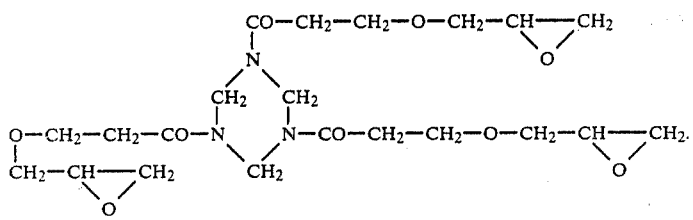

The printing paste obtained is printed, by rotary intaglio printing, onto a fabric containing 33% of cotton and 67% of polyester; the material is dried, subsequently treated in superheated steam at 180° for 7 minutes, washed out in water at 60° and dried. There is obtained a level yellow tone-in-tone printing.

EXAMPLE 3

An aqueous dye liquor containing per liter 100 g of a 15% dispersion of the dye of the formula

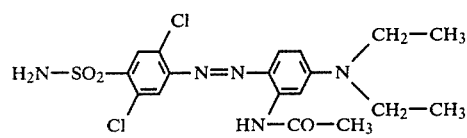

and 100 g of the compound of the formula

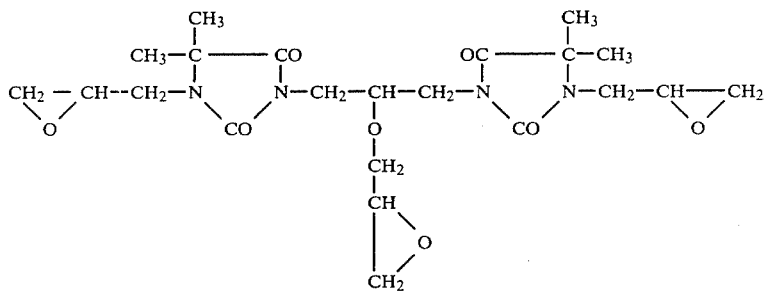

as well as 80 g of polyethylene glycol 400 is applied on a padding machine, with a liquor absorption of 100%, to a fabric made from 50% of cotton and 50% of polyester; the material is carefully dried, and thermofixed at 200° for 60 seconds; it is then washed at 60° and dried. A level bluish-red-dyed cotton fabric having good fastness properties is obtained.

EXAMPLE 4

80 parts of the dye of the formula

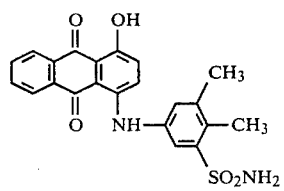

20 parts of glycerin triglycidyl ether and
100 parts of polyethylene glycol
are stirred into 800 parts of the stock thickening from Example 2; the printing paste obtained is applied by the stencil printing method to a knitted fabric consisting of 50% of polyester and 50% of cotton; the material is dried, and fixed in air at 210° for 35 seconds. The excess dye is washed out in water at 60° to leave a level reddish-blue printing having good fastness properties, with both constituents of the knitted fabric being printed tone-in-tone.

EXAMPLE 5

A fabric made from 67% of polyester and 33% of cotton is impregnated with a 10% aqueous solution of the epoxy compound from Example 1; it is squeezed out to a liquid absorption of 70% and dried. To this fabric is applied at a later point of time a printing paste containing 900 parts of the stock thickening from Example 2 and 100 parts of a 12% dispersion of the dye of the formula

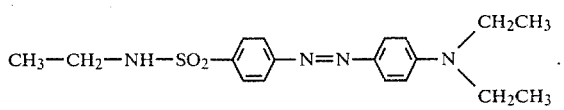

The material is afterwards again dried; it is then fixed for 3 minutes in superheated steam at 190° in a suspension loop steamer, subsequently washed at 60° and dried. A level, solid, orange-coloured printing is obtained.

EXAMPLES 6-44

If there are used, instead of the dyes used in Examples 1 to 5, the dyes listed in the following Table, with otherwise the same procedure, levelly dyed or printed textile material is obtained in the shades given in column III of the Table.

| Ex. | Dye | Shade on cellulose/polyester |
|---|---|---|
| 6 | 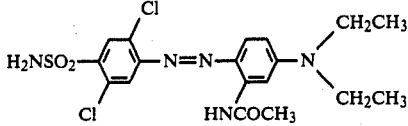 | bluish-red |
| 7 | 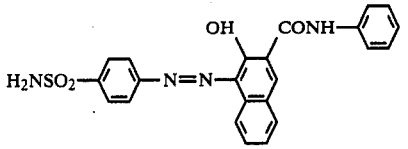 | orange |
| 8 | 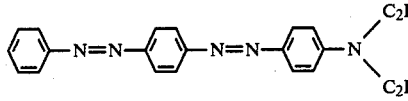 | scarlet |
| 9 | 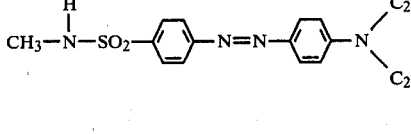 | orange |
| 10 | 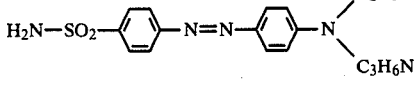 | orange |
| 11 | 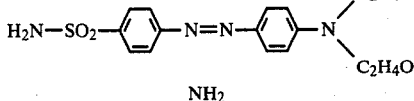 | orange |
| 12 | 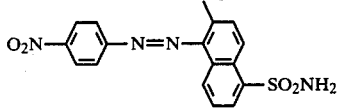 | red |
| 13 | 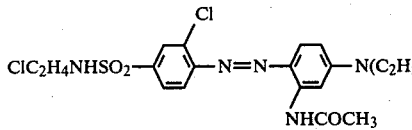 | yellowish-red |
| 14 | 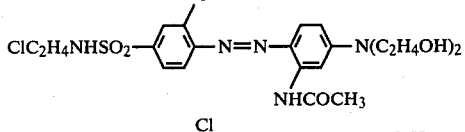 | scarlet |
| 15 | 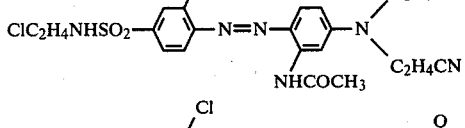 | orange |
| 16 | 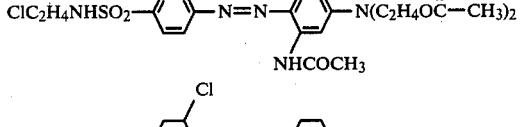 | orange |
| 17 | 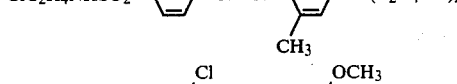 | orange |
| 18 | 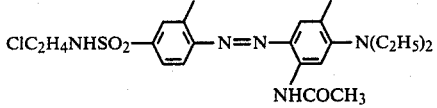 | bluish-red |

-continued

| Ex. | Dye | Shade on cellulose/polyester |
|---|---|---|
| 19 | ClC$_2$H$_4$NHSO$_2$—C$_6$H$_4$—N=N—C$_6$H$_3$(NHCOCH$_3$)—N(C$_2$H$_5$)$_2$ | orange |
| 20 | ClC$_2$H$_4$NHSO$_2$—C$_6$H$_4$—N=N—C$_6$H$_4$—N(C$_2$H$_4$CN)$_2$ | gold-yellow |
| 21 | H$_2$NSO$_2$—C$_6$H$_4$—N=N—C$_6$H$_4$—N(C$_2$H$_4$CN)$_2$ | gold-yellow |
| 22 | C$_2$H$_5$NHSO$_2$—C$_6$H$_4$—N=N—C$_6$H$_3$(NHCOCH$_3$)—N(C$_2$H$_4$OH)$_2$ | orange |
| 23 | HOC$_2$H$_4$NHSO$_2$—C$_6$H$_4$—N=N—C$_6$H$_3$(NHCOCH$_3$)—N(C$_2$H$_5$)$_2$ | orange |
| 24 | C$_6$H$_5$—NH—SO$_2$—C$_6$H$_4$—N=N—C$_6$H$_3$(NHCOCH$_3$)—N(C$_2$H$_4$OH)$_2$ | orange |
| 25 | 2,5-Cl$_2$C$_6$H$_3$—N=N—C$_6$H$_4$—NHC$_2$H$_4$SO$_2$NH$_2$ | yellow |
| 26 | H$_2$NSO$_2$—C$_6$H$_4$—N=N—[4-methyl-5-hydroxy-1-phenylpyrazol-3-yl] (coupler: HO, CH$_3$, N-C$_6$H$_5$ pyrazole) | yellow |
| 27 | 2-Cl-4-(ClC$_2$H$_4$NHSO$_2$)C$_6$H$_3$—N=N—[4-methyl-5-hydroxy-1-phenylpyrazol-3-yl] | yellow |
| 28 | 2-Cl-4-(ClC$_2$H$_4$NHSO$_2$)C$_6$H$_3$—N=N—[4-methyl-5-amino-1-phenylpyrazol-3-yl] (H$_2$N instead of HO) | yellow |
| 29 | H$_2$NO$_2$S—C$_6$H$_4$—N=N—[3-cyano-4-methyl-6-hydroxy-2-oxo-1H-pyridin-5-yl] | yellow |
| 30 | H$_2$NO$_2$S—C$_6$H$_4$—N=N—[3-cyano-4-methyl-6-hydroxy-2-oxo-1-ethyl-pyridin-5-yl] (N—C$_2$H$_5$) | yellow |
| 31 | 2-Cl-4-(ClC$_2$H$_4$NHSO$_2$)C$_6$H$_3$—N=N—[3-cyano-4-methyl-6-hydroxy-2-oxo-1-(2-hydroxyethyl)pyridin-5-yl] (N—C$_2$H$_4$OH) | yellow |

-continued

| Ex. | Dye | Shade on cellulose/polyester |
|---|---|---|
| 32 | H₂NO₂S—C₆H₃(Cl)—N=N—CH(COCH₃)—C(O)—NH—C₆H₅ | greenish-yellow |
| 33 | H₂NO₂S—C₆H₂(Cl)₂—N=N—C₆H₃(NHCOCH₃)—N(C₂H₅)₂ | red |
| 34 | H₃C—C₆H₃(NO₂)—N=N—CH=C(CH₃)—N(H)—N=C(O)— (pyrazolone) | yellow |
| 35 | H₃CSO₂—C₆H₃(NO₂)—N=N—CH=C(CH₃)—N(H)—N=C(O)— (pyrazolone) | yellow |
| 36 | 2-CN-C₆H₄—N=N—pyridine(NH₂)(NH₂) | yellow |
| 37 | H₃CSO₂—C₆H₃(Cl)—N=N—C₆H₃(NHCOCH₃)—NH₂ | orange |
| 38 | H₂NSO₂—C₆H₄—N=N—C₆H₃(NHCOCH₃)—NH₂ | yellowish-orange |
| 39 | C₆H₅—N=N—naphthyl-NH₂ | yellow |
| 40 | 1,5-diamino-4,8-dihydroxy-... anthraquinone with NHC₆H₅ | blue |
| 41 | 1,4-bis(NHCH₂—CH(OH)—CH₂Cl) anthraquinone | blue |
| 42 | 1-NH₂-4-NHCH(CH₃)₂ anthraquinone | blue |
| 43 | 1-OH-4-NH—C₆H₄—NH₂ anthraquinone | reddish-blue |

| I<br>Ex. | II<br>Dye | III<br>Shade on cellulose/polyester |
|---|---|---|
| 44 | 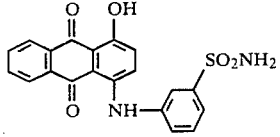 | reddish-blue |

EXAMPLE 45

A knitted fabric made from 50% of polyester and 50% of cotton is preliminarily treated in a manner exactly identical to that described in Example 5 and printed by the transfer printing method for 30 seconds at 200°. The employed transfer printing paper was produced as follows: On a rotary screen printing machine, a paper of 80 g/m² is printed with a printing paste analogous to that from Example 5 but with the use of the dye of the formula

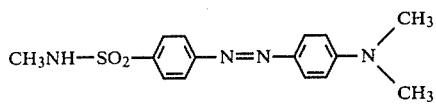

and is then dried.

There is obtained a level orange-coloured printing which does not have to be washed out, since on wetting practically no further dye is removed.

We claim:

1. A process for pad-dyeing or printing textile material comprised of cellulose and polyester fibers, comprising the steps of applying to the textile material a dispersion of a disperse dyestuff having an alkylatable hetero atom of oxygen, sulfur or nitrogen; applying to the textile material a compound having at least two epoxide groups or groups convertible to epoxide groups; and finally heating the textile material sufficiently to bring about alkylation of the dyestuff oxygen, sulfur or nitrogen atom by the epoxide compound; wherein the process is carried out in the absence of alkali, urea, thiourea, whereby both the cellulose fibers and the polyester fibers of the textile material are dyed in a level, tone-in-tone shade.

2. Process according to claim 1, in which are used disperse dyes containing a nitrogen atom which can be alkylated.

3. Process according to claim 2, in which are used disperse dyes having at least one —SO₂NHR group, where R can represent hydrogen or an optionally substituted alkyl, aryl, cycloalkyl or aralkyl group.

4. Process according to claim 1, in which is used as compound containing epoxy groups a compound which can react with the cellulose in addition to being able to react with the hetero atom of the dye, which hetero atom can be alkylated.

5. Process according to claim 4, in which is used an aliphatic, cycloaliphatic or aromatic polyalcohol having two epoxy groups.

6. Process according to claim 4, in which is used a nitrogen-containing heterocycle having two epoxy groups.

7. Process according to claim 1, in which the employed compound having groups convertible into epoxy groups is a compound containing chlorohydrin groups.

8. Process according to claim 1, in which textile material is impregnated before the dyeing or printing operation with the compound containing epoxy groups.

9. Process according to claim 1, in which is used for the dyeing or printing operation dye dispersions or dye pastes containing the compound having epoxy groups.

10. Process according to claim 1, in which the impregnating liquor or printing paste also contains a swelling agent.

11. Process according to claim 10, in which the epoxy compound acts as the swelling agent.

12. Process according to claim 1, in which the heat treatment consists in heating for 60 seconds at 200° to 210° C.

13. Process according to claim 1, in which the heat treatment consists in steaming at normal pressure with superheated steam at 170° to 200° C. for 5 to 8 minutes.

14. The textile material dyed or printed by the process according to claim 1.

15. A padding liquor or printing paste containing water, a disperse dyestuff having an alkylatable hetero atom of oxygen, sulfur or nitrogen, and a compound having at least two epoxide groups or groups convertible to epoxide groups, in the absence of alkali, urea, thiourea.

16. Padding liquor or printing paste according to claim 15, which further contains a swelling agent.

* * * * *